United States Patent Office.

ELLIOTT A. LOWDERMILL, OF GRAND JUNCTION, TENNESSEE.

*Letters Patent No. 75,776, dated March 24, 1868.*

IMPROVED MEDICAL COMPOUND.

*The Schedule referred to in these Letters Patent and making part of the same.*

TO ALL WHOM IT MAY CONCERN:

Be it known that I, ELLIOTT A. LOWDERMILL, of Grand Junction, Hardeman county, State of Tennessee, have invented a new, useful, and valuable Medical Compound Fluid, known to me and which I name as "Lowdermill's Compound Fluid," and is for the cure of pneumonia, coughs, colds, hoarseness, rheumatism, neuralgia, enlargement of the spleen, swellings, risings, (especially rising breasts,) bone-felon, bruises, burns, cuts, headache, toothache, kidney-affections, &c.; and I do hereby declare that the following is a full and exact description thereof—its component parts and proportions—reference being had to the accompanying samples.

Vial A is gum-camphor dissolved in alcohol; vial B is pure spirits of turpentine; vial C is pure honey; package D is blue vitriol and alum, burned, pulverized, and mixed; vial E is the "compound fluid" prepared and ready for use.

The nature of my invention consists in the mixing of the above ingredients in the following proportions and manner: I take one pound of alum, and one pound of blue vitriol, and burn them both in an oven until they are thoroughly dry. I then pulverize them to the finest powder. I also take one gallon of alcohol, in which I dissolve three ounces of gum of camphor, one gallon of honey, and one gallon of spirits of turpentine, and mix them all thoroughly, which is my compound fluid prepared for use. For large quantities, I use the above ingredients in the above proportion.

I use my "compound fluid" in the following manner, to wit: In pneumonia, coughs, colds, and hoarseness, I give one teaspoonful, once a day, in a little water, and bathe over the pain, and saturate a piece of brown paper, and apply until relieved.

In rheumatism, neuralgia, enlargement of the spleen, swellings, risings, (especially rising breasts,) bone-felon, bruises, burns, cuts, headache, toothache, kidney-affections, &c., bathe the parts well, and apply the brown paper as in pneumonia.

Having thus fully described my "compound fluid," its ingredients and proportions, and its uses and applications, what I claim as my invention, and desire to secure by Letters Patent, is—

The compound fluid, composed of alcohol, honey, spirits of turpentine, gum-camphor, alum, and blue vitriol, in the proportions herein specified, and for the use and purpose described.

ELLIOTT A. LOWDERMILL.

Witnesses:
H. I. PATTERSON,
W. S. MORGAN.